United States Patent [19]
Richens et al.

[11] 3,708,077
[45] Jan. 2, 1973

[54] DEVICE MEANS FOR A VEHICLE IN A WAREHOUSING APPARATUS

[75] Inventors: Kenneth A. Richens, Salt Lake City; Scott C. Grover, Bountiful; James K. Allred, Salt Lake City, all of Utah; James H. Shook, Lakewood, Colo.

[73] Assignee: Eaton Yale & Towne Inc., Cleveland, Ohio

[22] Filed: June 11, 1971

[21] Appl. No.: 152,302

Related U.S. Application Data

[62] Division of Ser. No. 832,036, May 5, 1969, Pat. No. 3,632,001.

[52] U.S. Cl. .............................. 214/16.4 A, 60/53 A
[51] Int. Cl. ............................................... B65g 1/06
[58] Field of Search ....... 214/16.4 A; 60/53 A, 60 VS

[56] References Cited

UNITED STATES PATENTS

| | | | |
|---|---|---|---|
| 2,941,480 | 6/1960 | Sadler et al. | 60/53 A |
| 2,988,237 | 6/1961 | Devol | 214/11 R |
| 3,049,247 | 8/1962 | Lemelson | 214/16.4 A |
| 3,139,994 | 7/1964 | Chasar | 214/16.4 A |
| 3,196,616 | 7/1965 | Date et al. | 60/53 A |
| 3,212,263 | 10/1965 | Hann | 60/53 A |
| 3,230,699 | 1/1966 | Hann et al. | 60/53 A |
| 3,352,978 | 11/1967 | Hartman | 214/16.4 A |
| 3,406,846 | 10/1968 | O'Connor | 214/16.4 A |
| 3,486,092 | 12/1969 | Macko | 214/16.4 A |

*Primary Examiner*—Gerald M. Forlenza
*Assistant Examiner*—R. B. Johnson
*Attorney*—Teagno & Toddy

[57] ABSTRACT

Warehousing system apparatus has a storage rack with several vertically and horizontally related storage elements. A mast is moved horizontally on rails parallel to the face of a storage rack, and a platform moves vertically along the mast in response to signals from a three-brush signal wire pickup on a control wire strung along the rack. Vertical and horizontal hydraulic drives and controls are independent so that the platform may fly or move diagonally in the shortest line between locations in the storage rack. Electric motors constantly operate hydraulic pumps; pump output is controlled by stepping motors having telemetering switches to indicate pumping direction. A positive neutral band is provided in the hydraulic system for better drive control. A carrier which is driven from the platform into the rack has a cam means to change the position of load driving lugs each time the carrier is driven to a maximum displacement from the platform.

10 Claims, 12 Drawing Figures

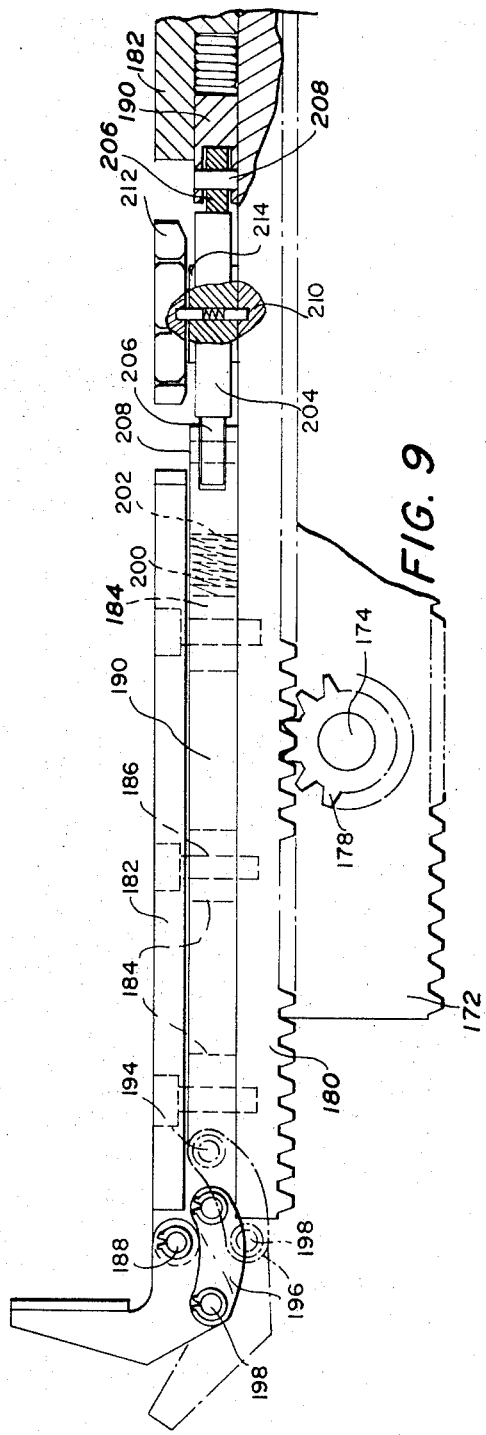
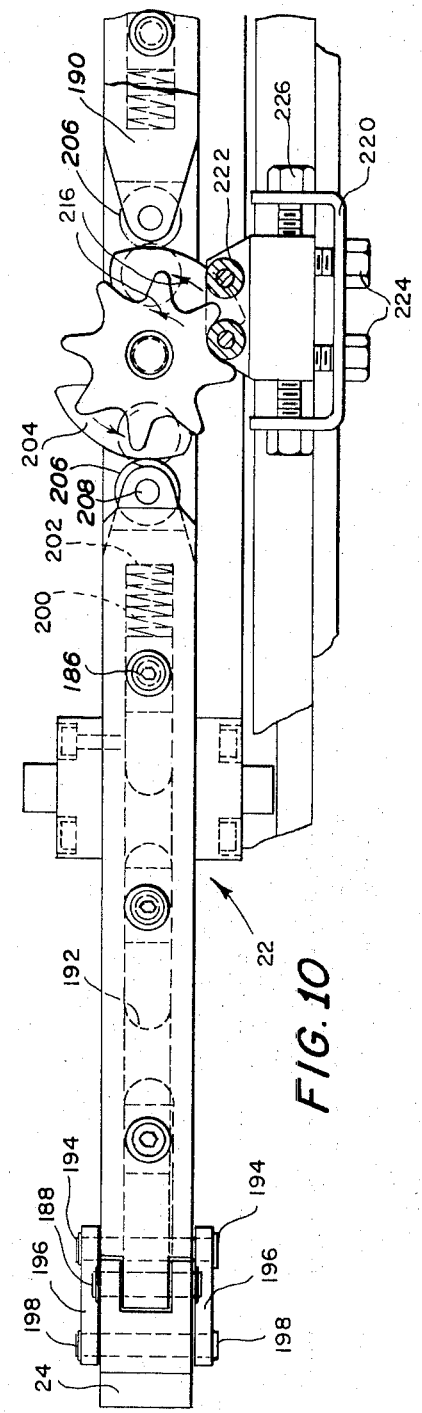
FIG. 9
FIG. 10

3,708,077

DEVICE MEANS FOR A VEHICLE IN A WAREHOUSING APPARATUS

This is a division of co-pending application Ser. No. 832,036, filed May 5, 1969 now U.S. Pat. No. 3,632,601 granted Jan. 4, 1972.

BACKGROUND OF THE INVENTION

Warehousing systems have come into wide use, and much attention has been given to the development of fast, accurate and dependable warehousing equipment which operates automatically with very little human supervision. High costs associated with conventional warehousing and needs for rapid systems have speeds commensurate with improved mass production, rapid transportation, and inventory control techniques have required more automated systems. Many warehousing systems have several rows of storage racks which are supplied by input and output conveyors near ends of the racks. Stacker-retriever apparatus is located in each aisle between the racks to take goods from an input conveyor, to carry the goods to a particular location in the rack, to insert the goods in the racks, and to withdraw the goods from the racks, to carry them to the output conveyor, and to deposit them thereon as in other words, perform an automatic warehousing function. Control of the input and output conveyors and control of the stacker-retriever is effected by a remote computer. The computer is connected with the stacker-retriever either by physical inner-connection or by radio waves to control the movement of operation thereof.

Other warehousing systems which employ stacker-retrievers have a single rack face on one side of an aisle which is serviced by a stacker-retriever. On the other side of the aisle several stations with control consoles are provided to signal the main control computer as to the appropriate disposition of a load placed at the station, that is its appropriate storage place in a rack, or the storage place in a rack from which a load is desired to be deposited at the station.

Other warehousing systems which employ stacker-retrievers have a single rack face on one side of an aisle which is serviced by a stacker-retriever. On the other side of the aisle several stations with control consoles are provided to signal the main control computer as to the appropriate disposition of a load placed at the station, that is its appropriate storage place in a rack, or the storage place in a rack from which a load is desired to be deposited at the station.

For convenience, the present invention has been described as in use with the latter form of warehousing system. It is obvious however, that the stacker-retriever which is described herein has equal application for use with a multiple aisle input and output conveyor system. Well known auxiliary apparatus transfers loads between conveyors and a stacker platform having a carrier configured to drive loads or to draw loads laterally off or on the platform.

Many problems remain in stacker-retriever technology. Because masts are very tall, acceleration and deceleration control are very important. Wear of mast supporting rails and rollers caused by driving friction causes rough travel and inaccuracy in the positioning of loads. Complexity of cycling circuitry and mechanical driving apparatus for shuttles inserters is another problem. Additionally, communications between a stacker-retriever and a main control console are difficult.

SUMMARY OF THE INVENTION

The present invention solves problems in stacker-retriever technology by providing a hydraulic drive apparatus with unique acceleration, deceleration and positioning controls. Problems associated with wear are avoided by driving and supporting the mast with mutually distinct surfaces. Inserter circuitry complexity is limited to starting an electric motor in either direction. Accurate communications are insured by a three brush link.

While a preferred form of the stacker-retriever is described in detail herein with a mast carriage moving on floor mounting rails, all of the benefits of the invention are achieved by supporting the mast on overhead rail and driving the mast on separate overhead surface. While the invention described herein in the detailed portion of the specification discusses a preferred embodiment in which both horizontal and vertical drives are electrohydraulically operated, it is obvious that either of the independent drive systems may be operated in a conventional manner.

One object of this invention is the provision of hydraulic drive apparatus with smooth acceleration and deceleration which is controlled by counters.

Another object of this invention is the provision of means for controlling acceleration drive and deceleration of horizontal and vertical stacker-retriever components in a warehouse system.

Another object of this invention is the provision of drive apparatus for a stacker-retriever which is independent of support surfaces for the mast.

A further object of this invention is the provision of mechanically cycled inserter apparatus for stacker-retrievers in warehousing systems.

Another object of this invention is the provision of redundant input and output signal pickups for warehousing communications systems.

These and other objects of the invention will be apparent from the specification which includes the claims and from the drawings.

BRIEF DESCRIPTION OF THE DRAWINGS

FIG. 9 is a side elevation detail of a camming mechanism for raising and lowering the load engaging lugs.

FIG. 10 is a plan view detail of the apparatus of FIG. 9.

DETAILED DESCRIPTION OF THE DRAWINGS

Figure 1:
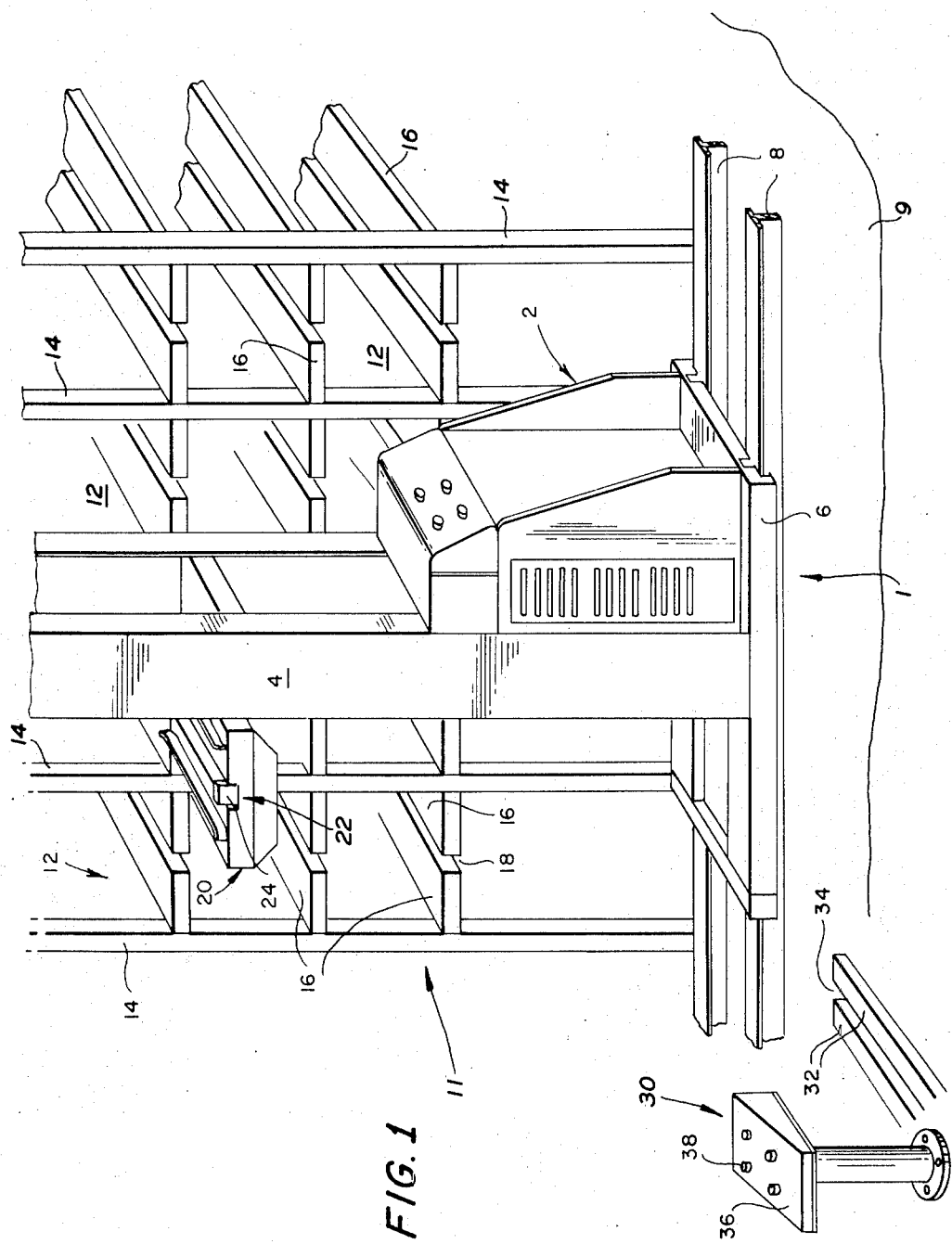
FIG. 1 is a perspective view of warehousing system apparatus of the present invention, showing the general relationship of the stacker-retriever, storage racks and station elements.

Referring to FIG. 1, a warehousing system apparatus is generally referred to by the numeral 1. A stacker-retriever 2 comprises a mast means 4, including a carriage 6. Mast means 4 and its carriage 6 move along parallel rails 8, which are mounted on the floor 9 of warehouse parallel to the face of a storage rack 11. Storage rack 11 defines a plurality of load bins 12 and includes a plurality of vertical columns 14 and horizontal shelves 16. Each bin 12 has horizontal shelves 16 which are spaced from each other, defining a central opening 18 therebetween.

Moving mast means 4 and its carriage 6 along rails 8 aligns load platform 20 on stacker-retriever 2 adjacent a vertical row of storage bins 12. Platform 20 is raised and lowered on mast 4 to align the platform 20 with a specified shelf of the storage bin. Movement may be affected in vertical and horizontal directions simultaneously, so that the platform 20 may fly or move in a diagonal direction adjacent the face of storage rack 11. When platform 20 is aligned at the appropriate bin 12, a shuttle mechanism 22 is driven transversely to rails 8 and mast 4 into the storage bin gap 18 between shelves 16. If a load is on platform 20 as it approaches the designated bin, lugs 24 of the shuttle 22 are in an up, load-engaging position. As shuttle mechanism 22 is driven into the storage rack, lugs 24 which are in the up position drive the load into the rack. As soon as shuttle mechanism 22 approaches an extended position from platform 20, lugs 24 are cammed downward into a load-passing position in a manner to be described hereinafter, and shuttle 22 is withdrawn into platform 20 with lugs 24 remaining in the down position. Platform 20 is then ready to be relocated adjacent a next designated station, whereat shuttle mechanism 22 is driven into the station with lugs 24 in the downward position. As the shuttle mechanism 22 approaches the extended position, lugs 24 are cammed to an upward load-engaging position. As the shuttle 22 is withdrawn onto the platform, lugs 24 engage and pull the load onto the platform.

The warehouse system 1 includes a load pickup station 30. The pick-up station 30 includes parallel shelves 32 which are spaced from each other leaving a gap 34 therebetween through which shuttle mechanism 22 moves. A control station 36 with buttons 38 programs a main control console, not shown, by designating a bin 12 from which a load is to be picked up for placing on shelves 32, or by designating the locus of a bin 12 to which a load from shelves 32 is to be returned.

Figure 2:
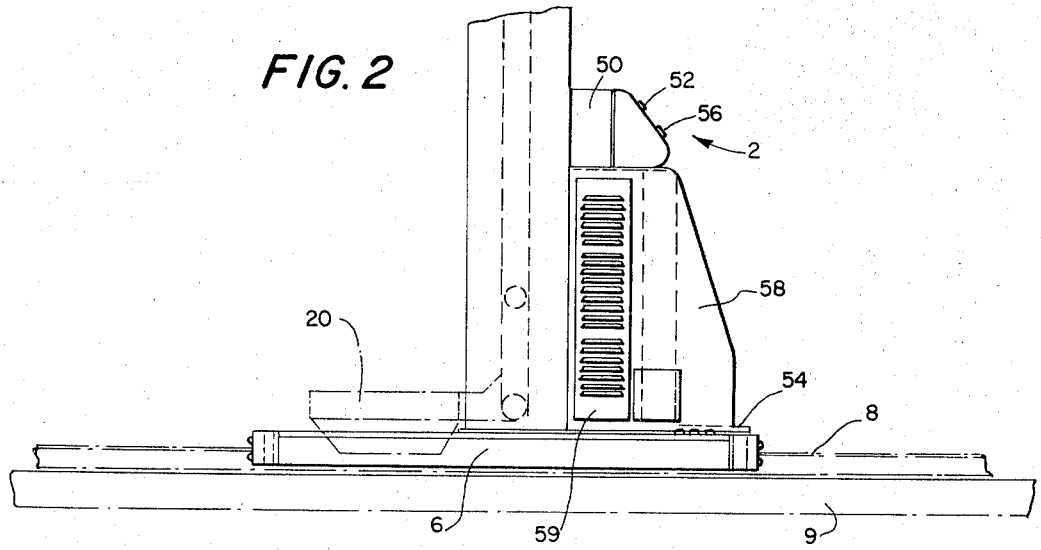
FIG. 2 is a side elevation of a stacker-retriever of the present invention.

FIG. 2 describes the stacker 2 in more detail. Mast assembly 4 is supported by carriage 6, riding on rails 8, which are fixed to floor 9. Platform 20 is selectively driven up and down mast 4 between lower and upper limits of the platform 20 as shown in phantom lines. Shuttle mechanism 22 and lugs 24 move transversely to the plane of the drawing, sliding loads on and off platform 20 between a pair of load guides 26. The latter are provided to insure that a load is centered on the platform 20 or in the appropriate bin 12 in the storage rack 11 as the load is being slid on and off platform 20.

Electrical power is supplied to the stacker by an umbilical cord lying in a specially provided channel on the floor 9. Alternatively, power may be supplied to the stacker via the rails 8 or through a third rail positioned between the rails 8 and preferably below floor level in a manner which is conventional to railway operations.

Figure 2A:
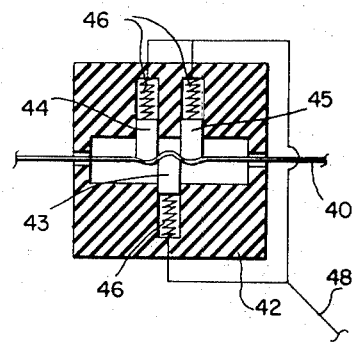
FIG. 2A is a cross-sectional detail of a signal wire pickup.

Control signals are supplied to the stacker 2 by a signal wire 40 which is strung along the storage rack adjacent an upper extremity of mast 4 or which alternatively may be positioned adjacent one of the rails. Signals are picked up from a wire 40 as shown in detail in FIG. 2A. In most assemblies single pickups vibrate when moving across a wire, producing spurious signals or interference. The present signal pickup assembly 42 is designed to be interference free. Assembly 42 is mounted on the stacker 2 for movement along the wire 40 so that the wire 40 passes through the assembly 42. First, second, and third brushes 43, 44 and 45 are arranged in the assembly 42 so that the first brush presses the wire toward the second and third brushes 44, 45 which are oppositely mounted with respect to the first brush 43. In a conventional manner, springs 46 insure contact of the brushes 43, 44, 45 with the wire 40. Outputs of the brushes are connected to a common output 48 which carries the signal from the wire 40 to the onboard control unit 50. Lights 52 may be provided in the control unit to indicate mode of operation, stacker location and destination.

Although the stacker 2 is constructed for automatic operation in response to instructions from a computer console at a remote location, the stacker 2 may be driven by an onboard operator. An operator's step 54 is spring loaded to an upward position. An operator standing on step 54 causes the step to be depressed, closing a switch similar to a conventional railroad dead man switch. The switch under step 54 operates relays, stopping automatic operation of the stacker and associated automatic control apparatus, and permitting the onboard operator to control the stacker 2 in its vertical, horizontal and transverse movements by manually operating switches 56. Fairings 58 insure against portions of the operator's body protruding in the direction of the storage rack 11. Louvred access door 59 provides access to and cooling for the electric and hydraulic systems.

Figure 3:
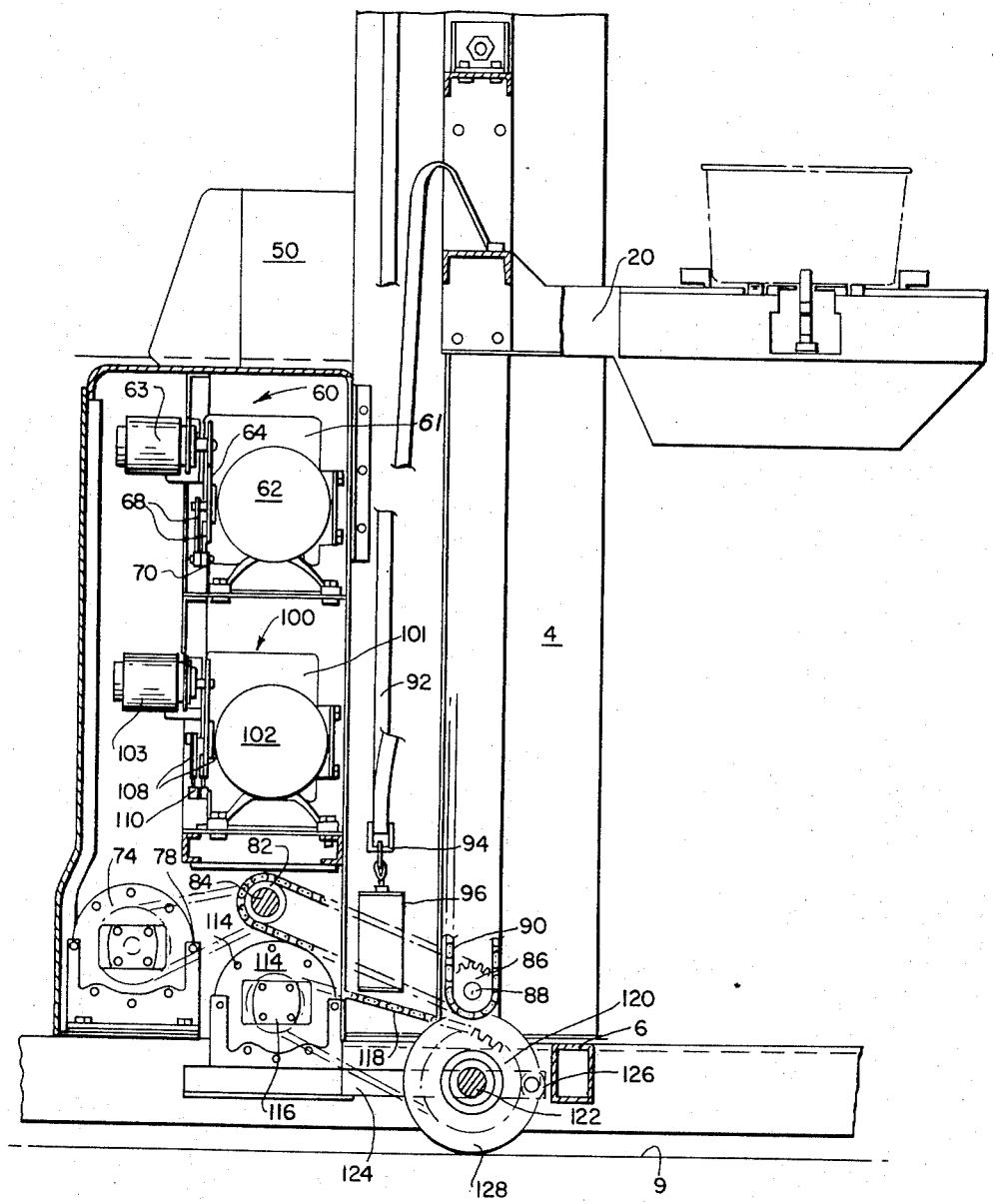
FIG. 3 is an elevational detail partially in cross-section, showing the arrangement of the driving apparatus of this invention.
Figure 4:
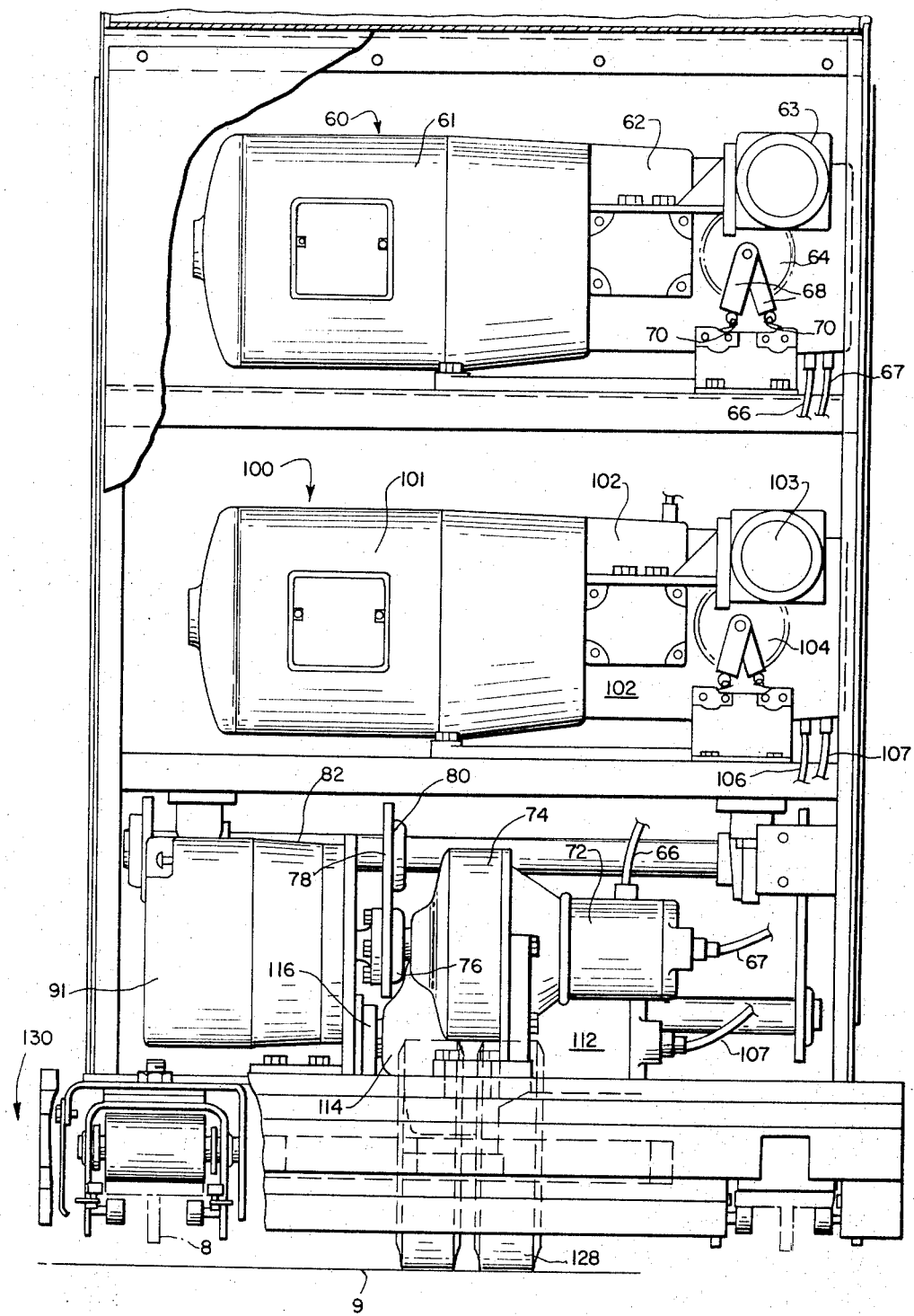
FIG. 4 is a side elevational detail partially cutaway view of the apparatus shown in FIG. 3.

Referring to FIGS. 3 and 4 of the drawings, horizontal and vertical driving 13 effected by electric motors which constantly drive hydraulic pumps, the outputs of which are controlled in positive or negative directions or at null positions. Outputs of the pumps are connected through delivery lines, which feed hydraulic motors which in turn drive sprockets and chains connected to the vertical platform drive and to the main horizontal driving wheels.

Upper motor-pump combination 60 provides power to drive platform 20 vertically along mast 4. klectric motor 61, which is directly connected to hydraulic pump 62, drives pump 62 at a constant speed. A stepping control motor 63 drives gear 64, which in a well-known manner controls pump configuration and hence the output of pump 62 through intake and discharge lines 66 and 67. Cams 68 on gear 64 depress telemetering switches 70 which feed back pump status information to onboard control system 50. One switch indicates forward operation; the other switch indicates reverse; depression of both switches indicates a null or no-output condition of the pump 62.

Delivery lines 66 and 67 connect pump 62 to inputs of hydraulic motor 72, which drives reduction gears located in housing 74. Reduction gearing in housing 74 drives sprocket 76 and chain 78, which is connected to sprocket 80 on idler shaft 82. Chain 84 in turn drives sprocket 86 on shaft 88. Another sprocket on shaft 88, similar in size to sprocket 86, drives chain 90 to which platform assembly 20 is attached, for movement of the platform assembly 20 along the mast 4 thereby.

A disc brake assembly 91 is connected to sprocket 76 to positively lock the sprocket at various positions which correspond to desired vertical positions of the platform 20. An umbilical cable harness 92 connects the on-board control unit 50 with an actuator on platform 20. Harness 92 has a yoke 94, which suspends a weight 96 to maintain the cable harness 92 under tension during movement of the platform assembly 20.

The central motor-hydraulic pump system 100 has an electric motor 101 which continually turns hydraulic pump 102. Commercially available stepping motor 103, which has a pulsed rotary output, drives gear 104, which controls the output setting of pump 102. Cams 108 mounted on gear 104 selectively close telemetering switches 110, for indication of the mode of operation of pump 102, that is, forward, reverse or neutral in a manner similar to that described with respect to motor-pump system 60.

Outputs of pump 102 are connected through delivery lines 106 and 107 to hydraulic motor 112. Hydraulic motor 112 drives reduction gearing in housing 114, which in turn drives sprocket 116. Sprocket 116 drives chain 118, which is connected to sprocket 120 on main drive axle 122.

Main drive axle 122, hydraulic motor 122 and the reduction gearing are mounted on a lever 124, which is pivoted at point 126 to stacker carriage 6. The normal force between a pair of driving wheels 128 and floor 9 is maintained constant at a value dictated by the weight of hydraulic motor 112 and reduction gear 114 and their position on pivoted lever 124, as well as the weight of axle 122, driving wheels 128, chain 118 and related equipment. The center of gravity and hence the applied movement on lever 124 may be adjusted by changing the position of hydraulic motor 112 and reduction gear 114 on lever 124. Thus, the normal force between wheel 128 and floor 9 and, consequently, the frictional force are controlled and maintained constant, regardless of the weight of the stacker, including the mast 4, carriage 6, platform assembly 20, load and related equipment. Driving wheels 128 do not wear the rails 8 with frictional contact. Moreover, the weight of the stacker assembly and its load are born entirely by roller assemblies 130, which support the stacker 2 on parallel rails 8. Alignment of the stacker assembly relative to the rack 11 is consequently, not influenced by wear between driving surfaces.

Figure 5:
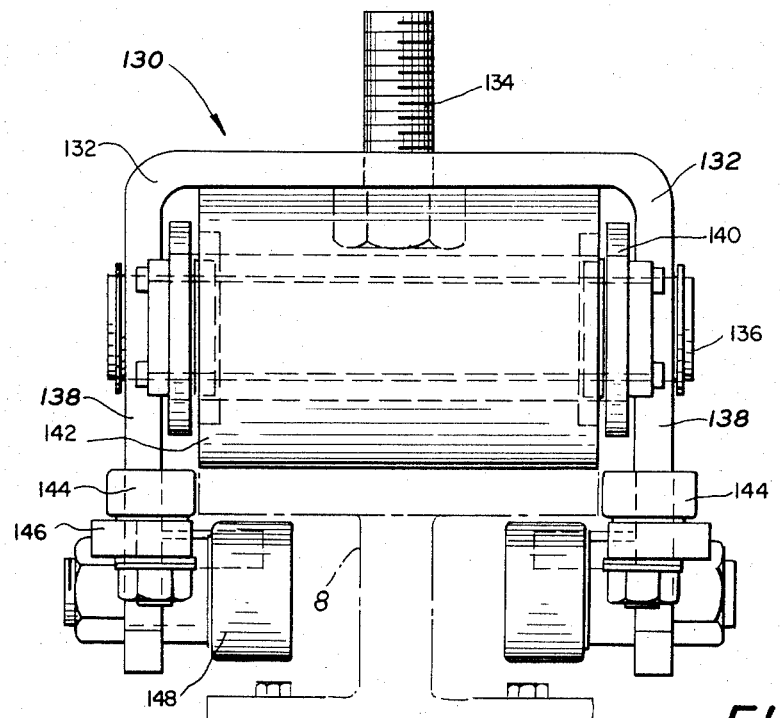
FIG. 5 is an end elevational detail of a roller assembly which is employed in the present invention.
Figure 6:
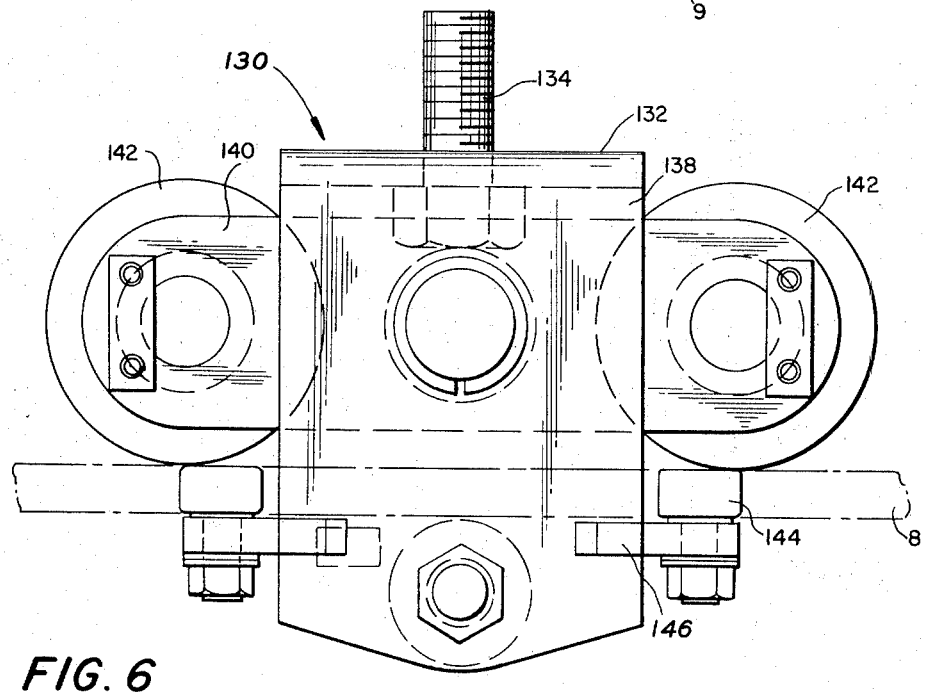
FIG. 6 is a side elevational detail of the roller assembly shown in FIG. 5.

Roller assemblies 130 which are illustrated in greater detail in FIGS. 5 and 6, are provided at each of the four corners of carriage 6. Each assembly comprises a downward opening U-shaped member 132 which is centrally connected to carriage frame 6 by bolt 134. Pin 136 medially spans parallel flanges 138 of the U-shaped member 132. Parallel cross pieces 140 are mounted for rotational movement of pin 136 interiorly of flanges 138, and rollers 142, which are the principle support of the stacker 2, are mounted at opposite ends of cross members 140. The interaction of flanges 138, pin 136 and cross pieces 140 distributes the weight on each assembly equally between the two rollers 142.

To insure proper alignment on track 8, wheels constructed of cam followers 144 are connected to extensions 146 on flanges 138, so that the wheels are spaced slightly away from lateral edges of track 8. To insure against lateral and fore and aft tipping of the tall mast assembly, auxiliary rollers 148 are connected to flanges 138 beneath rail 8. Although any form of auxiliary rollers is suitable and economical for use as wheels 144 and 148 of roller assemblies 130.

Beside disc brake assemblies such as 91 which are connected to driving gears to lock the vertical and horizontal driving apparatus, caliper brakes which engage upper and lower surfaces of the tracks may be mounted on roller assemblies 130 or elsewhere on carriage 6 to be operated to lock stacker 2 on the rails 8 and to prevent horizontal movement when an appropriate location has been reached.

Figure 7:
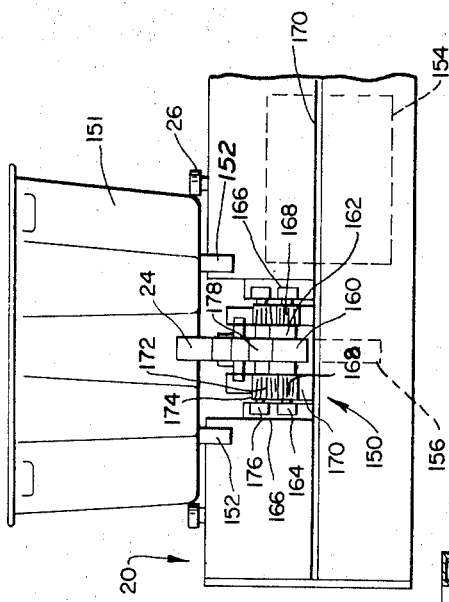
FIG. 7 is an end elevational of the platform which is vertically movable to selected storage and station locations.

Referring to FIG. 7, a drive mechanism generally referred to by the numeral 150 is provided on platform 20 for driving shuttle 22, lugs 24, and, hence, load 151 away from the platform or back towards the platform once platform 20 has been aligned with an appropriate rack element. Guide wheels 26 align load 151 on platform 20; skate wheels 152 provide friction free movement of load 151 across platform 20.

Figure 8:
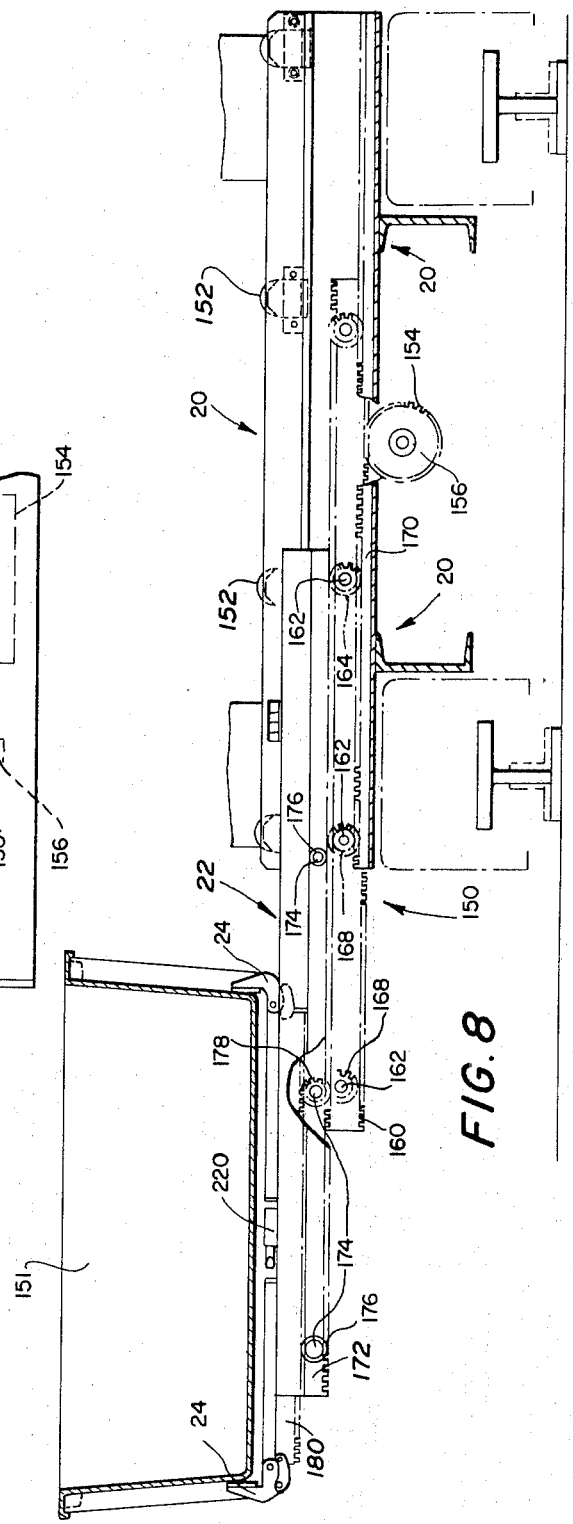
FIG. 8 is a side elevation of the platform and carrier, showing the carrier in an extended position of maximum lateral displacement from the platform.

As shown with further reference to FIG. 8, motor and reduction gear means 154 drive a pinion gear 156, which in turn drives rack 160. Shafts 162 are mounted transversely and medially in rack 160; those shafts terminate in rollers 164 located in grooved rigid lateral supports 166. Pinions 168 are loosely mounted on shafts 162 so that moving rack 160 with gear 156 moves pinions 168 across a toothed surface of stationary rack 170, which is fixed to the platform assembly 20.

The turning of pinions 168 by moving them across rack 170 causes the pinions to drive second movable rack 172 in the same direction as rack 160. As is conventional in such interleaved rack and pinion actuators, rack 172 moves twice the distance of rack 160. Transversely mounted in rack 172 are three shafts 174. Each of these shafts carries rollers 176 which are mounted in corresponding grooves of stationary lateral supports 166 to provide support for rack 172. The central shaft 174 mounts a pinion 178 which meshingly engages the upper teeth of rack 160, turning the pinion and thereby driving a third rack 180 which is directly connected to the shuttle 22.

The construction of rack 180 and its relationship to rack 172 causes an operational change of position of lugs 24 as is more clearly shown with reference to FIGS. 9 and 10. Rack 180 of shuttle 22 has bolted thereto and spaced from an upper surface thereof, two hold-down blocks 182. Spacer blocks 184 and bolts 186 join rack 180 and upper bar 182. Pins 188 are mounted at remote ends of hold-down bars 182, and lugs 24 are pivoted on pins 188. Blocks 184 act as guides for the actuator bars 190 which are received in slots 192 of lug actuator bars 190. Pins 194 are mounted in the outer ends of actuator bars 190 and links 196 are connected to those pins. The remote ends of links 196 are connected to pins 198 which are mounted in the lugs 24. When actuator bars 190 are in their outermost position, pins 198 are forced outwardly about pins 188, causing lugs 24 to pivot upwardly about the latter pins. When bars 190 are in their innermost position, pins 198 are pulled forwardly about pin 188, drawing lugs 24 downward to their load-passing position.

The innermost block 184 of each assembly inwardly supports compression spring 200 which bears against inner surface 202 of actuator bar 190, continually urging actuator bar 190 toward an inner, lug-down position. Actuator bar 190 is forced outward by cam 204. Cam 204 pushes against cam followers 206 mounted on pins 208 in the inner ends of actuator bars 190. Cam 204 is rotatably mounted on pins 210 in a position to engage cam followers 206 which are located on the inner ends of actuator bars 190. Cam 204 is mounted on a pintle pin 210 which is fixed centrally on rack 180. A sprocket gear 212 is connected to the pintle pin 210 above cam 204. Sprocket gear 212 and cam 204 are interconnected by a one-way drive mechanism, such as a ratchet 214, so that gear 212 will turn cam 204 only when the sprocket gear 212 is turned in the direction shown by arrows 216.

Turning of sprocket gear 212 is effected when gear 212 moves across teeth 222 in housings 220, which housings are fixed to rack 172 near outer ends thereof. As shown best in FIG. 8, housings 220 are connected on opposite lateral sides of the racks 172 so that gear 212 and cam 204 are turned in the direction of arrows 216 every time racks 172 and 180 are moved to an extreme outward position from the centered position. The relationship of teeth 222 to gear 212 is such as to turn can 204 one-quarter revolution upon each actuation. Thus, if cam 204 is in the position shown in FIG. 10 with bars 190 forced outward and lugs 24 in the up position, moving carriage 22 to the right, which is withdrawing shuttle 22 toward the centered position on the platform 20, has no effect on cam 204, since that movement moves gear 212 across teeth 222 in a direction causing clockwise rotation of gear 212 with a resulting slippage of the ratchet 214. Therefore, the cam position is undisturbed and the lug position also remains unchanged. That is the mode of operation in which a load is drawn to a centered position on the platform 20. As shuttle 22 is driven to an extreme extended position from platform 20 in either direction, gear 212 is moved across teeth 222 in a manner which turns gear 212 in a direction of arrow 216, causing cam 214 to be rotated 90° from the position shown in FIGS. 9 and 10, and allowing bar 190 to be driven inwardly by spring 200, thus, drawing lugs 24 downward to a load-passing position. The position of the lugs 24 is changed, either from a down to an up or from an up to a down position each time shuttle 22 is driven to a maximum displacement from platform 20 in either direction from a centered position.

To insure the correct engagement of teeth 222 and gear 214, adjusting screws 224 are provided in housing 220. To insure that cam operation takes place precisely at the end of outward strokes, adjusting screws 226 are provided to longitudinally adjust the position of teeth 222 with respect to rack 172.

Figure 11:
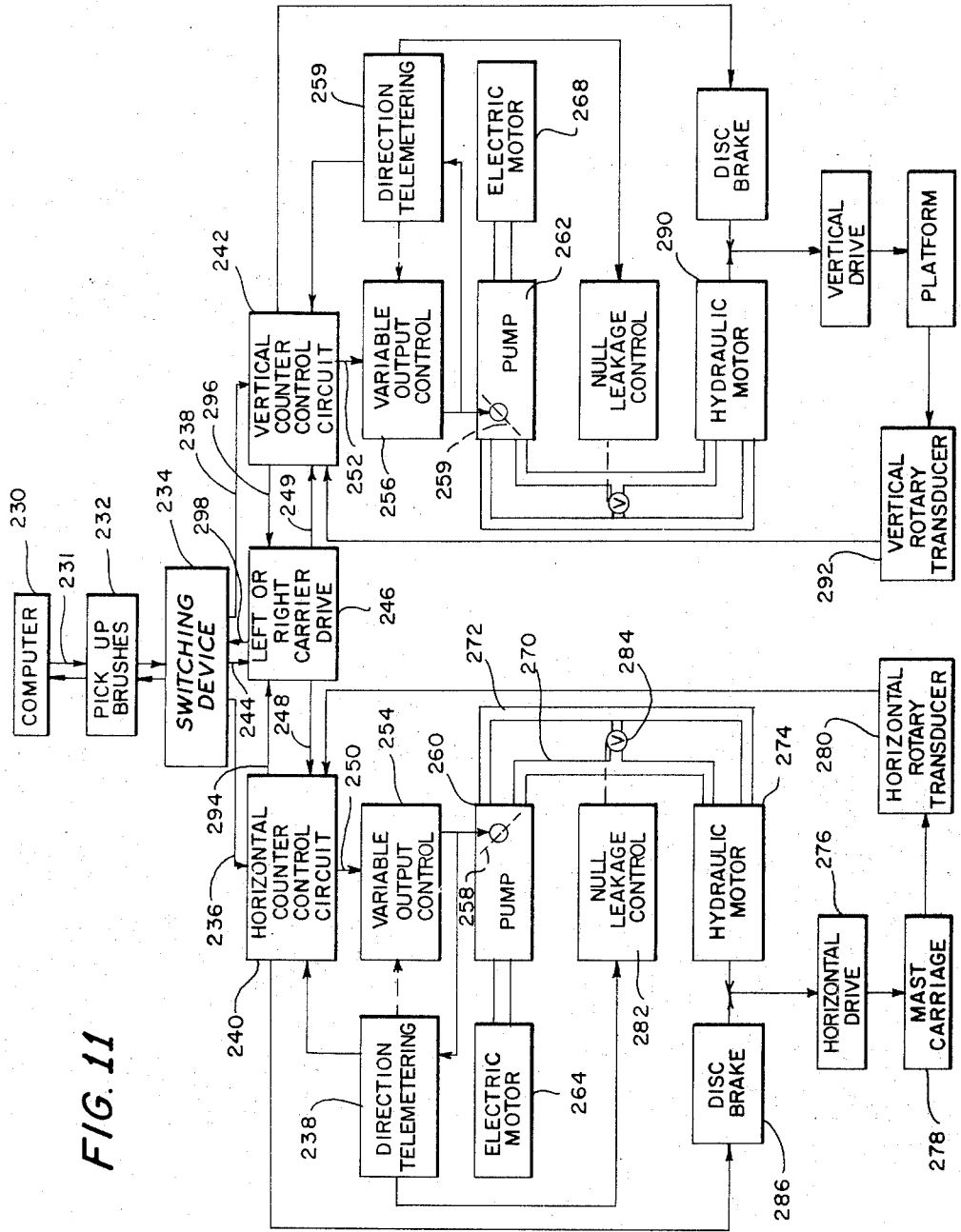
FIG. 11 is a schematic flow chart representation of the operational interrelationship of parts of the invention.

As generally shown in FIG. 11, a central computer 230, which controls the entire warehouse operation and which is remote from the stacker-retriever 2, is programmed to control sequential operations of the stacker-retriever 2. Computer 230 has memory devices which store the particular location of the stacker-retriever mast and platform. The computer 230 then signals the stacker-retriever 2 to move the platform to another location and the carrier 22 of the platform 20 to cycle to the left or to the right. The instructions from the computer are sent across a control wire 231 in the form of digital pulses which are picked up by pickup brushes 232 described in detail in FIG. 2A. The pickup brushes 232 transfer the digital pulses to a switching device 234. A first coding pulse opens circuit 236 to horizontal counter control circuit 240. The next sequence of pulses passing through the switching device 234 sets the horizontal coun-er in control circuit 240 to preset the next horizontal position of the stacker 2.

The next series of pulses from computer 230 through line 231 is a coded sequence which closes the switch to the line 236 and which opens a switch to line 238. The next sequence of pulses presets the counter in vertical counter control circuit 242 to determine the vertical location of the platform 20. The next series of pulses is a coded signals which closes the switch to line 238 and opens a switch to line 244 which sets up the carrier drive circuit 246 for a left or right drive sequence.

As soon as a drive signal has been received by stacker drive 246, that information is communicated to the horizontal and vertical counter control circuits 240 and 242 through lines 248 and 249. A start signal is generated in the counter control circuits 240 and 242. Signals are passed through lines 250 and 252 to start the operation of variable output controls 254 and 256.

Because the mast is very tall, acceleration of its carriage is very significant in that rapid accelerations or decelerations may cause whipping of the mast which produces unwarranted forces in the carriage 6 and rails 8. Acceleration control of the platform 20 is not as critical, but it is important that the platform 20 accelerate and decelerate at a controlled rate. It is especially important that platform 20 neither downwardly accelerate nor upwardly decelerate at speeds sufficient to allow the loads to float.

In a preferred form of the invention, variable output controls 254 and 256 are very slow speed motors with a predetermined output speed that are movable slowly between predetermined maximum angular displacements and which are stoppable at those displacements and at a zero point between the two maximums. Stopping may be controlled by position switches such as the telemetering switches shown in FIGS. 3 and 4 and schematically designated in FIG. 11 as direction telemetering devices 258 and 259.

Variable output controls 254 and 256 change the positions of swash plates 258 and 259 in variable displacement pumps 260 and 262 which are continuously driven by electric motors 264 and 268. According to the setting of swash plate 258, pump 260 supplies hydraulic fluid under pressure in lines 270 and 272 to drive hydraulic motor 274. The motor in turn operates the horizontal drive 276 which moves mast carriage 278 (6 in FIG. 1) along the tracks. Horizontal transducer 280 produce pulses which are delivered to horizontal counter control circuit 240 to step the counter toward the zero point. Direction telemetering device 258 has an input to counter 240 so that pulses produced by the rotary transducer 280 are added or subtracted from the counter as appropriate from the desired direction of travel. Alternatively, the rotary transducer may produce pulses differentiated according to direction which are distinguishable by the counter. As the counter approaches the zero point, at some predetermined time, a slow or stop signal is provided in line 250 to variable output control 254. The latter decreases the angle of the swash plate and finally places the swash plate in a zero output position. When the zero output position is noted by the direction telemetering equipment 258, current is provided to null leakage control 282 to open valve 284 so that no pressure differential is provided to motor 274. In addition to being a solenoid valve, valve 284 may be a high pressure release valve so that high pressure differential between lines 270 and 272 is relieved. When the appropriate point is reached, disc brake 286 is set, locking horizontal drive 276. Additionally, caliper brakes not shown may be clamped on the rail. Should the device overrun the zero setting, the circuit automatically employs the overrun in the counter to correct the position back to zero.

Concurrently with the mast being set at the proper position, the platform 20 is set at the proper vertical position by operating the hydraulic motor 290 until the vertical rotary transducer 292 has produced sufficient pulses to return vertical counter 242 to its zero setting. When both horizontal counters and vertical counters have achieved their zero settings, signals are provided through lines 294 and 296 to enable carrier drive 246 to perform its preprogrammed left or right cycle. Upon cycling, the shuttle 22 automatically picks up or discharges a load, depending only upon the physical position of lugs 24 when the shuttle 22 is driven into its maximum position of displacement from the platform 20.

While the horizontal and vertical positioning is being affected, switching device 234, is receiving the next pulse train for programming the next movement of the stacker-retriever. As soon as carrier drive 146 has been cycled, a signal is given through line 298 to begin the next stacker sequence.

As can be seen from the remainder of the schematic diagram, the power and control train of the vertical drive for the platform is similar to the power and control train for the horizontal drive of the mast carriage. Shuttle drive is affected by a reversible electrical motor which drives in a first direction to a maximum point controlled by limit switches on the shuttle 22 or accumulative angular displacement switch on the motor drive shaft and then drives in the other direction a similar amount so that the carrier is centered on the platform after cycling. The vertical and horizontal drive circuits can become affected only when the shuttle 22 is centered on the platform 20 due to interlocking of the controls in a known manner. Because of the interlocking controls, the shuttle drive may be operated only when the vertical and horizontal counters are stationary at a predetermined reading. Primarily three operating instructions are provided to the stacker-retriever 2 by the computer 230. The horizontal counter and the vertical counter are reset away from zero according to the respective horizontal and vertical components of the distance to be traveled from the present location to the next location of the stacker-retriever's platform. Additionally, the computer 230 instructs the shuttle 22 by presetting circuits for shuttle cycling to the right or to the left of the platform 20. When these three instructions have been provided, a go signal is generated, the horizontal and vertical drives operate concurrently for as long as necessary, accelerating and then decelerating as the respective counters approach zero. As soon as both counters are on zero for a brief predetermined time delay to insure against overrun, the carrier 22 is cycled with respect to the platform 20. The delivery or retrieval mode of operation of the shuttle lugs 24 is not controlled by the computer. The delivery or retrieval mode of the shuttle lugs 24 is simply a mechanical function which automatically changes the position of the lugs 24 upon extreme displacement of the shuttle 22 from the platform 20 as was previously described in detail.

While the invention has been particularly shown and described with reference to a preferred embodiment thereof, it will be understood by those skilled in the art that various changes in form and details may be made therein without departing from the spirit and scope of the invention.

What we claim is:

1. In a warehousing system apparatus having an elongated aisle, a storage rack with a face parallel to the aisle, a plurality of load holding elements in the rack adjacent to and accessible to from the aisle, a track mounted adjacent the storage rack in the aisle, a mast on the track for moving along the aisle parallel to the face of the rack, horizontal propelling means connected to the mast for moving the mast in the aisle, a platform mounted on the mast for vertical movement thereon, vertical propelling means connected to the mast and to the platform for driving the platform up and down the mast, a shuttle movably mounted on the platform, transverse propelling means connected to the shuttle and to the platform for moving the shuttle into and out of the rack, whereby loads within the rack are transferred to the platform by the shuttle, and whereby the loads are relocated within the aisle by movement of the mast and platform, the improvement comprising:

fluid supply means mounted on the mast,
fluid pressure source means mounted on the mast and connected to the fluid supply means, the fluid pressure source means having electric motor means mounted on the mast and connected to a source of electrical power, fluid pump means connected to the electric motor means and to the fluid supply, and first and second fluid delivery line means connected to the pump means,
first and second fluid pressure control means connected to the fluid pressure source means for respectively controlling pressure in the first and second delivery line means, first hydraulic motor means connected to the first delivery line means, first mechanical driving means connected to the first hydraulic motor means and to the mast for driving the mast along the aisle in response to pressure applied in the first delivery line means, second hydraulic motor means connected to the second delivery line means, and second mechanical driving means connected to the second hydraulic motor means, to the mast means and to the platform for driving the platform along the mast in response to fluid pressure in the second delivery line means, said control means comprises control motor means having shaft means connected to the pump means for controlling the output thereof and further comprising;

indicator means connected to the shaft means for indicating the position of the shaft means and therefore the direction in which fluid pressure difforential exists in first and second delivery line means interconnecting the motor means and the pump means, the indicator means further comprising cam means connected to the shaft means and switch means adjacent the cam means for operation thereby for sensing the position of the cam means and hence the shaft means.

2. Warehousing system apparatus of claim 1 wherein:

first fluid pressure control means comprises a horizontal drive counter control means, a horizontal drive variable output control means connected to the horizontal drive counter means and connected to the fluid pressure source means for controlling fluid pressure in the first delivery line means in response to the condition of the horizontal drive counter means, and pulsing means connected to the mast and to the aisle for producing pulses as the mast moves horizontally in the aisle and connected to the horizontal drive counter means for supplying pulses thereto for changing condition thereof, and wherein the second fluid pressure control means comprises a vertical drive control circuit means, a vertical drive variable output control means connected to the vertical drive counter means and connected to the fluid pressure source means for controlling fluid in the second delivery line means in response to the condition of the vertical drive counter means, and pulsing means connected to the mast and to the platform for producing pulses as the platform moves vertically on the mast and connected to the vertical drive counter means for supplying pulses thereto for changing condition thereof.

3. Warehousing system apparatus of claim 2 wherein the electric motor means and pump means comprise:

first and second electric motors respectively connected to first and second pumps, and wherein the horizontal and vertical drive variable output control means are interconnected to the first and second pumps, respectively.

4. The warehousing system apparatus of claim 3 further comprising:

first and second direction indicator switches connected to respective interconnections between horizontal and vertical drive variable output control means and the first and second pumps for indicating positions of the interconnections and output conditions of the pumps.

5. The warehousing system apparatus of claim 4 wherein:

the first and second direction indicator switches are connected to the respective variable output control means transmitting direction signals to the variable control means.

6. The warehousing system apparatus of claim 4 wherein:

the first and second direction indicator switches further are connected respectively to the horizontal and vertical drive counter control circuit means to provide direction indicate relative movement between the mast and aisle and between the platform and mast.

7. The warehousing system apparatus of claim 4 wherein the first delivery means comprises:

first parallel hydraulic lines between the first pump means and the first hydraulic motor means, and wherein the apparatus further comprises first valve means between the first parallel lines, first leakage control means connected to the direction indicator means and connected to the first valve means for operating the first leakage control means and opening the first valve means when the horizontal variable output control controls the pump at the middle null position.

8. The warehousing system apparatus of claim 1 wherein the mast further comprises:

a plurality of roller means for supporting the mast on the track, with mast movement limited to longitudinal reciprocation therealong, and wherein the horizontal propelling means comprises pivot means connected to the mast, lever means connected to the pivot means, axle means connected to the lever means at a location remote from the pivot means, driving wheel means connected to the axle means, and weight means mounted on the lever means remote from the pivot means, for urging the drive wheel means into frictional engagement with a floor surface of the aisle means.

9. The warehousing system apparatus of claim 8 wherein the weight means comprises:

hydraulic motor means and reduction gear means operatively connected to the driving wheel means for moving the mast along the track.

10. The warehousing system apparatus of claim 1 wherein the improvement further comprises:

lugs mounted on the shuttle for movement with respect thereto between an upper load-engaging position and a lower load-passing position, lug control means connected to the shuttle and to the lugs for positioning the lugs with respect to the shuttle and movement direction responsive means connected to the shuttle, platform and means for moving the lug control means and changing position of the lugs upon completion of each outward movement of the shuttle with respect to the platform.

* * * * *

PO-1050 (5/69)

UNITED STATES PATENT OFFICE
CERTIFICATE OF CORRECTION

Patent No. 3,708,077      Dated 1/2/73

Inventor(s) K.A.Richens; S.C.Grover; J.K.Allred; J.H.Shook

It is certified that error appears in the above-identified patent and that said Letters Patent are hereby corrected as shown below:

PLEASE NOTE THAT THE TITLE OF THE INVENTION SHOULD READ "DRIVE MEANS FOR A VEHICLE IN A WAREHOUSING APPARATUS" ---- NOT "DEVICE......." AS PRINTED.

Signed and sealed this 29th day of May 19, 1973.

(SEAL)
Attest:

EDWARD M.FLETCHER,JR.
Attesting Officer

ROBERT GOTTSCHALK
Commissioner of Patents